(12) United States Patent
Hartmann

(10) Patent No.: US 6,655,615 B1
(45) Date of Patent: Dec. 2, 2003

(54) DEVICE FOR MINCING ORGANIC SUBSTANCES

(75) Inventor: Eduard Hartmann, Schneisingen (CH)

(73) Assignee: Bucher-Guyer AG, Niederweningen (CH)

( * ) Notice: Subject to any disclaimer, the term of this patent is extended or adjusted under 35 U.S.C. 154(b) by 0 days.

(21) Appl. No.: 09/647,766

(22) PCT Filed: Jan. 21, 2000

(86) PCT No.: PCT/CH00/00030
§ 371 (c)(1),
(2), (4) Date: Oct. 5, 2000

(87) PCT Pub. No.: WO00/47066
PCT Pub. Date: Aug. 17, 2000

(30) Foreign Application Priority Data

Feb. 11, 1999 (CH) .............................................. 0260/99

(51) Int. Cl.$^7$ ........................................... B02C 13/284
(52) U.S. Cl. .......................... 241/89.3; 241/71; 241/74; 241/86; 241/86.1; 241/88.1
(58) Field of Search .............................. 241/70, 71, 74, 241/86, 86.1, 88.1, 89.3, 222, 72

(56) References Cited

U.S. PATENT DOCUMENTS

| | | | | | |
|---|---|---|---|---|---|
| 1,758,702 A | * | 5/1930 | Jacobson | ..................... | 241/51 |
| 1,795,792 A | * | 3/1931 | Nielson | ....................... | 241/222 |
| 1,907,791 A | * | 5/1933 | Gredell | .......................... | 241/55 |
| 2,916,069 A | * | 12/1959 | Williams | .................... | 241/82.5 |
| 3,566,943 A | * | 3/1971 | Witt | .............................. | 241/88 |
| 4,584,919 A | | 4/1986 | Bittner | | |
| 4,604,925 A | * | 8/1986 | Wisdom | ......................... | 83/13 |
| 4,621,775 A | * | 11/1986 | Abom et al. | ................ | 241/86.1 |
| 4,802,631 A | * | 2/1989 | Arasmith | .................... | 241/88.1 |
| 4,958,775 A | * | 9/1990 | Arasmith | .................... | 241/88.1 |
| 4,972,888 A | * | 11/1990 | Dean | ........................... | 144/172 |
| 5,150,844 A | * | 9/1992 | McKie | ............................ | 241/73 |
| 5,687,921 A | * | 11/1997 | Moreels | ...................... | 241/86.1 |
| 5,694,824 A | * | 12/1997 | Jacko et al. | .................. | 83/403 |
| 5,842,653 A | * | 12/1998 | Elliott et al. | ............... | 241/88.1 |

FOREIGN PATENT DOCUMENTS

| | | |
|---|---|---|
| CH | 249 569 | 4/1984 |
| DE | 920 460 | 11/1954 |

* cited by examiner

Primary Examiner—William Hong
(74) Attorney, Agent, or Firm—Burns, Doane, Swecker & Mathis, LLP

(57) ABSTRACT

A tearing mill for comminuting fruits (3) is equipped with a tearing bed (15) with tearing elements (4) and delivery vanes (5) for the fruits (3). Directly upstream of the tearing elements (4) in terms of the delivery direction (v), openings (16) for the comminuted pieces of fruit (8) are disposed in the tearing bed (15). As a result, low mechanical stress on the comminuted product (8) and a small proportion of fine particles are achieved, which improves the yield and output in an ensuing juice extraction operation.

13 Claims, 6 Drawing Sheets

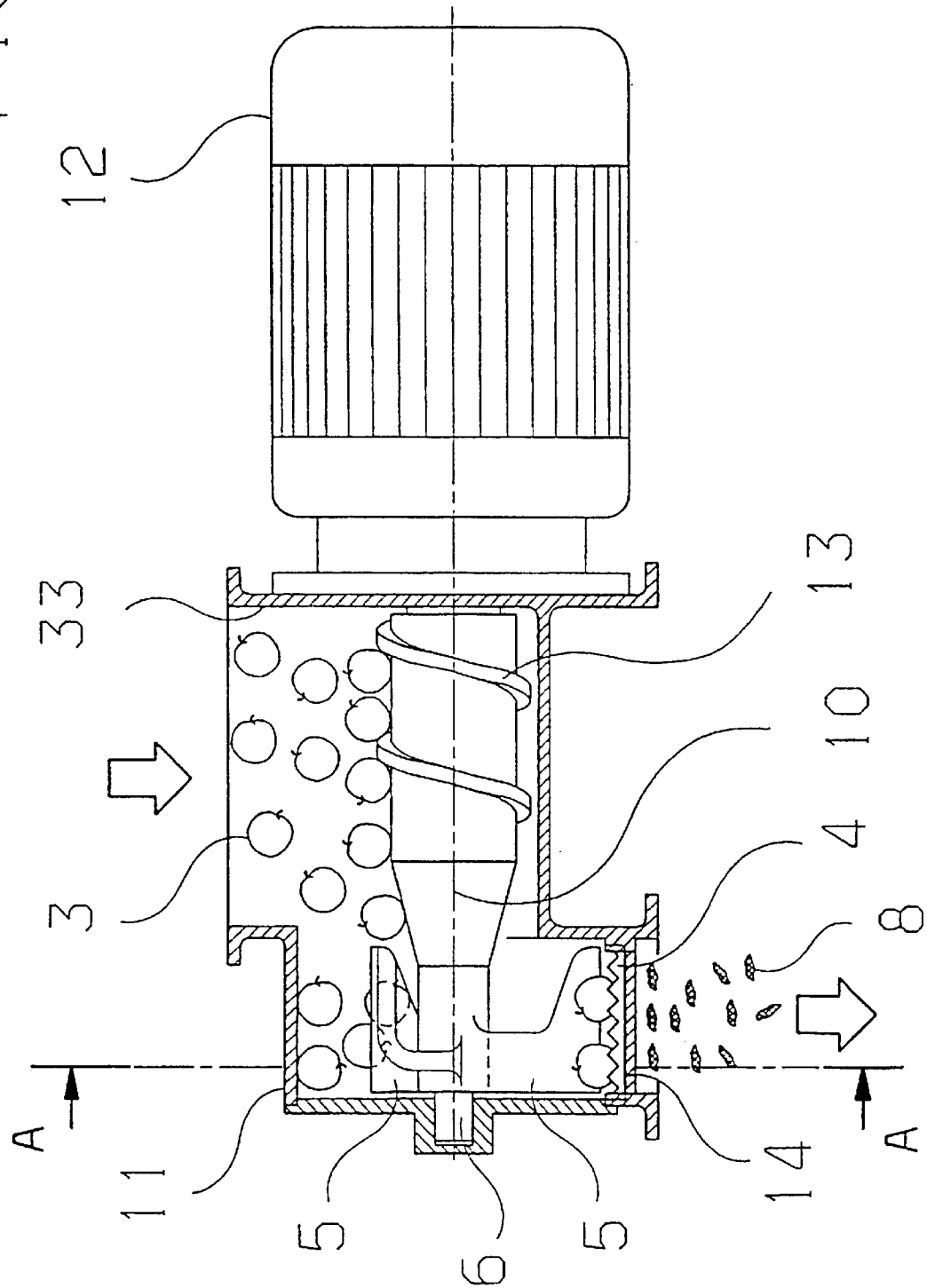

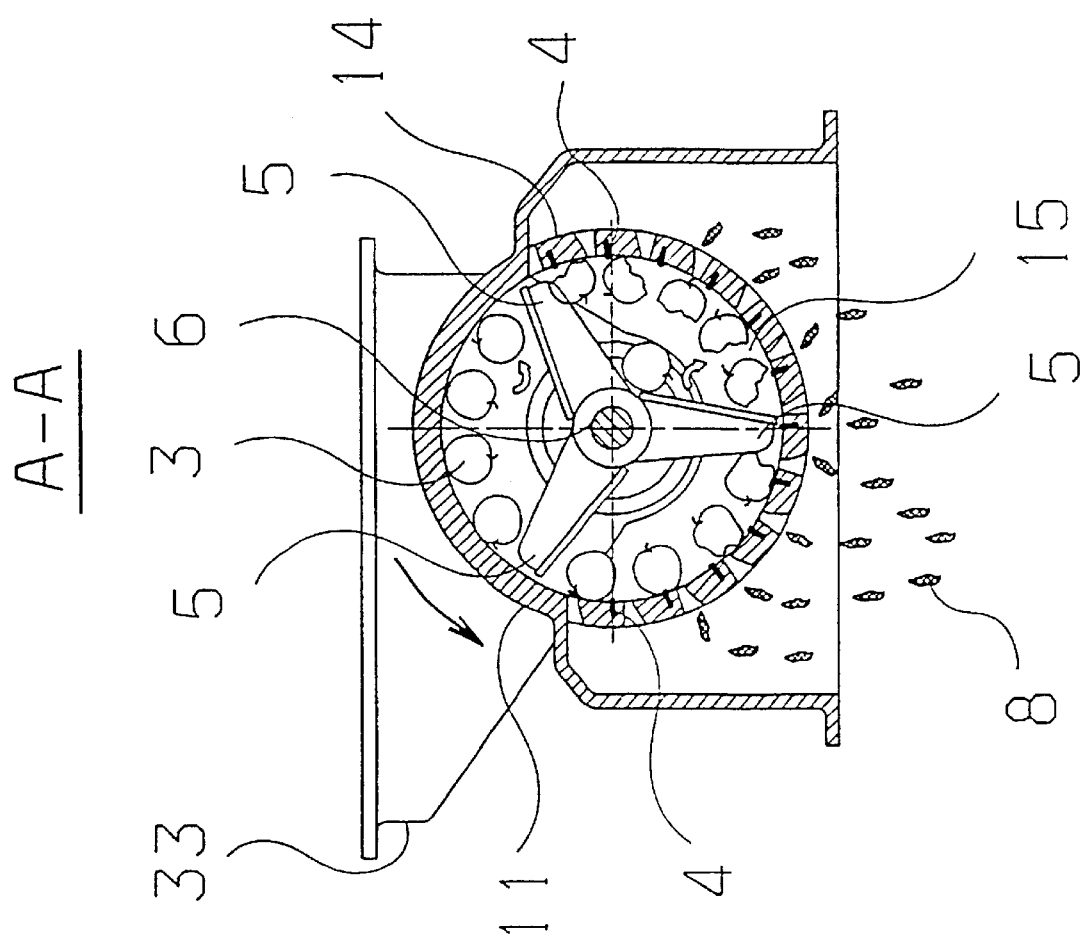

DEVICE FOR MINCING ORGANIC SUBSTANCES

The invention relates to an apparatus for comminuting organic substances, in particular for tearing apart fruits, including a stand, a tearing bed supported in the stand and having one surface as a travel path for the fruits, which path has tearing elements and next to them openings for the comminuted substances, the tearing elements protruding above the travel path by a height, and including means, supported in the stand, for delivering the organic substances to the tearing bed, and drive means for generating a relative motion between the tearing elements and the delivery means and the organic substances.

A drum-type cutting machine, particularly for cutting sugar beets into pieces, is known from U.S. Pat. No. 4,584,919 (Bittner). It has a number of retaining elements that are disposed at equal spacings over the circumference of the drum and extend substantially parallel to the axis of the drum. A knife chest in which at least one cutting knife whose cutting edge extends substantially circumferentially is secured is retained between each two retaining elements.

Various embodiments of drum mills of this type are also known for tearing apart fruits, such as the types sold under the name Central by Bucher-Guyer AG, Niederweningen, Switzerland. A drum mill of this kind includes a drum body, made in one piece, over whose circumference retaining elements for the tearing knives are disposed at small spacings. In the operationally ready state, the drum of such a mill forms a substantially closed hollow chamber, with an axial opening on one side through which the fruits to be torn apart are delivered by means of a transporting screw.

Figure 2:
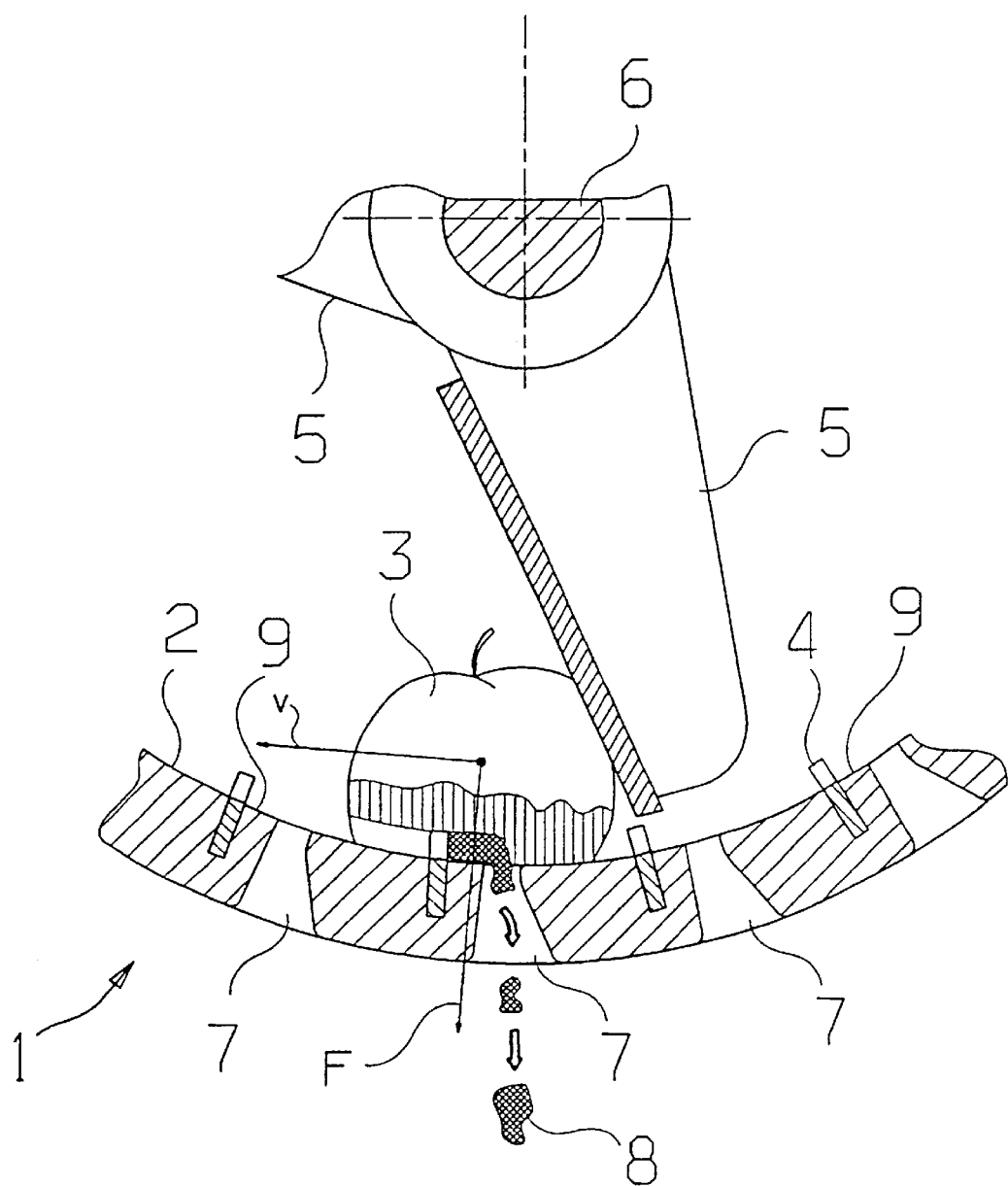

FIG. 2 in a detail shows the tearing apart of an apple in a known drum mill of this kind. Here the tearing bed takes the form of a drum 1, on whose inner surface 2 the travel path for the apples 3 along with the tearing knives 4 is located, shown in FIG. 2 in a section perpendicular to the drum axis. The drum 1 is stationary, while the apples 3 are fed through a screw, not shown, and are guided by vanes 5 of a rotor 6 at a speed v and a centrifugal force F over the surface 2 having the tearing knives 4.

One opening 7, as an outflow channel for the comminuted mash pieces 8 torn from the apples 3, is disposed between each two tearing knives 4. The outflow channels 7 extend axially at a spacing 9 parallel from the respective adjacent tearing knife 4. From FIG. 2 it can be seen that the apple 3 is thrust with high contact pressure F across the tearing knife 4. Given the known position of the outflow channels 7, theoretically a very long elongated piece 8 of flesh must have broken out of the apple 3 and entered the outflow channel 7, counter to the direction of motion v of the apple. In practice, this is highly unlikely. Experience tells that a large proportion of the pieces 8 of mash is thrust across the tearing knives 4 and thus reaches the subsequent outflow channel 7.

When the fruit is carried away in uncontrolled fashion in this way, the result is partial destruction of the mash structure because of the high pressing and friction forces that occur. Especially with soft fruit, this leads to a high proportion of fine particles in the mash, which very disadvantageously reduces the yield and output in an ensuing operation of juice extraction by pressing. Practical experience shows that even using tearing knives 4 with a very coarsely toothed tearing edge hardly decreases this proportion of fine particles.

The object of the invention is to overcome the above disadvantages of the known apparatuses for comminuting organic substances by means of a novel design.

According to the invention, this object is attained, in an apparatus of the type described at the outset, in that the openings in the tearing bed for the comminuted substances are disposed upstream of the tearing elements, in terms of the direction of relative motion, at a spacing which is less than the height of the tearing elements above the travel path. Versions in which the openings in the tearing bed directly adjoin the tearing elements are highly advantageous. Preferably, the openings are widened in the direction of passage of the comminuted substances. Further advantageous variants of the apparatus are defined by the claims.

A design of the apparatus according to the invention allows unhindered breaking out and expulsion of the torn-off ("wrenched-off") mash particles 8 from the fruit 3 into the outflow channels 7. The mash particles 8 undergo no additional stresses. The design, because of a selectable height of the knifelike tearing elements above the travel path of the tearing bed, permits direct variation of the mash structure, and the comminuted organic substances have only very small proportions of fine particles. Because of the improved removal of the mash with less friction, the energy required for comminution with the apparatus is reduced.

Figure 3:
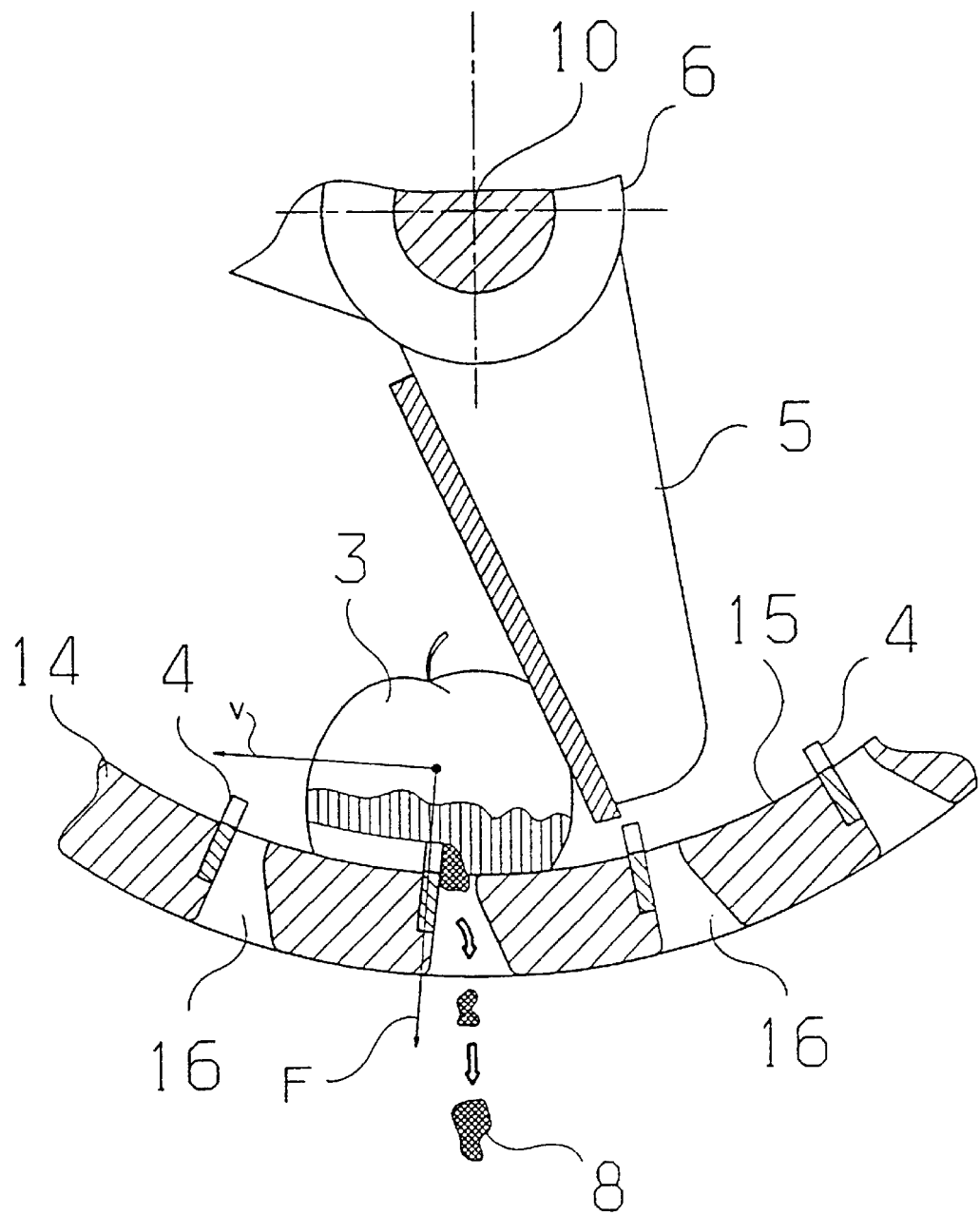
Figure 4:
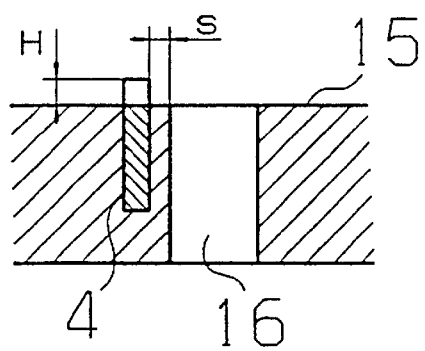
Figure 5:
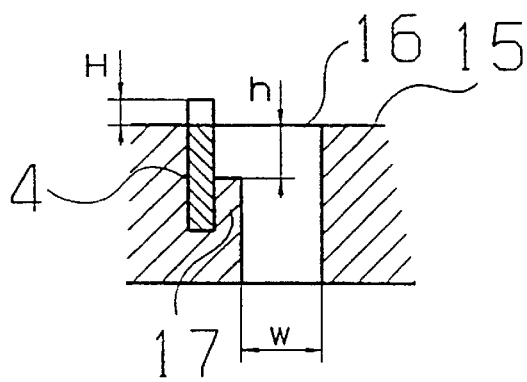
Figure 6:
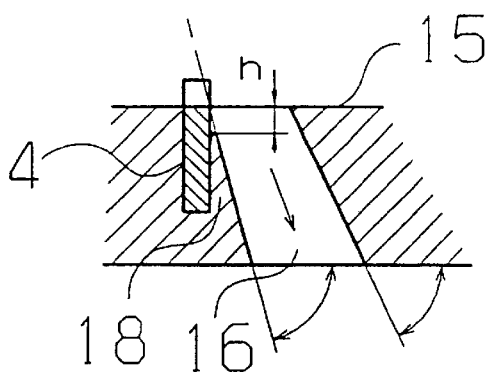
Figure 7:
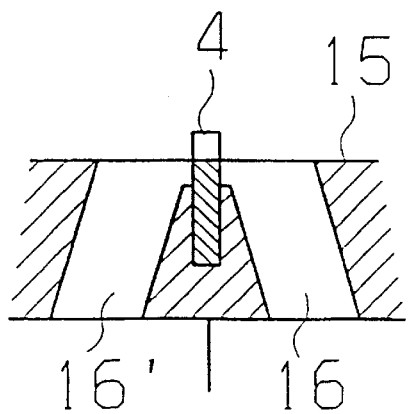
Figure 8:
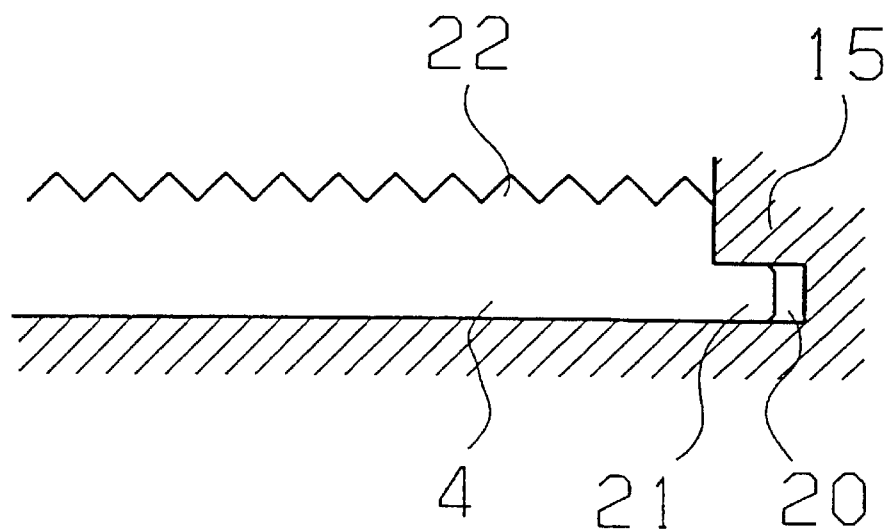
Figure 9:
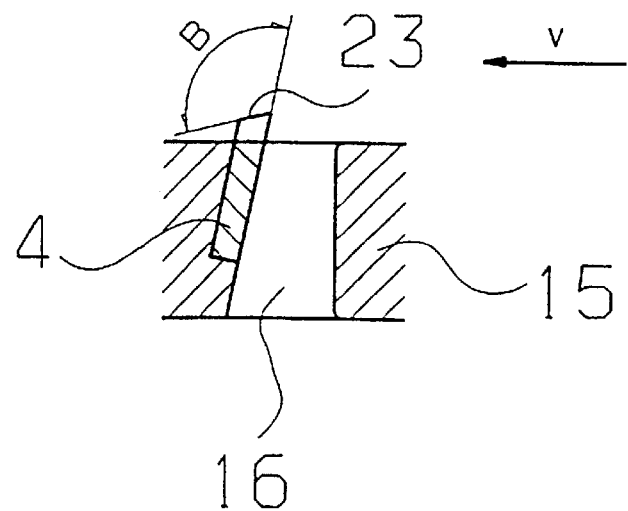

Exemplary embodiments of the invention are described in further detail in the ensuing description and in the drawing figures. Shown are:

FIGS. 1a and 1b, schematic cross sections through a tearing mill for fruits having a comminution apparatus according to the invention;

FIG. 2, a detail when an apple is torn apart in a known drum mill, in cross section;

FIG. 3, a detail when an apple is torn apart in a drum mill with a comminution apparatus according to the invention, in cross section;

FIG. 4, one variant of an opening through a tearing bed of a drum mill of FIG. 1;

FIG. 5, another variant of an opening through a tearing bed of a drum mill of FIG. 1;

FIG. 6, a further variant of an opening through a tearing bed of a drum mill of FIG. 1;

FIG. 7, a further variant of an opening through a tearing bed of a drum mill of FIG. 1;

FIG. 8, a diagram of a mounting of a tearing knife in a drum mill of FIG. 1; and FIG. 9, a diagram of a variant of a tearing knife at an opening through a tearing bed of a drum mill of FIG. 1.

As the schematic cross section through a tearing mill for fruits having a comminution apparatus according to the invention shows in FIG. 1a, this tearing mill includes a rotor 6, rotatably supported in a stand 11 about a horizontal axis 10, along with a motor 12 for driving the rotor. In a manner known per se, the rotor 6 includes a delivery screw 13 for transporting fruit 3 from a fill hopper 33 to a drum 14 acting as a tearing bed. As the section A—A in FIG. 1b shows even better, the rotor 6, on its portion protruding into the drum 14, has three vanes 5 for guiding the fruit 3 over the inside surface of the drum 14 acting as the tearing bed 15.

As FIGS. 1a and 1b show, a number of tearing knives 4 with a sawlike tearing edge are inserted parallel to the axis 10 into the lower part of the tearing bed 15. As the detail of FIG. 1b shown in FIG. 3 indicates, between each two tearing knives 4, one opening 16 is provided as an outflow channel for comminuted mash pieces 8 torn from the fruit 3.

In contrast to the known design in FIG. 2, in FIG. 3 the outflow channels 16 extend axially immediately adjoining the respective adjacent tearing knife 4. It can be seen that the fruit 3 is thrust over the tearing knives 4 with high contact pressure F. This design of the apparatus allows unhindered breaking out and expulsion of the torn-off ("wrenched-off") mash particles 8 from the fruit 3 into the outflow channels 16.

A variant of an outflow channel 16 as an opening through the tearing bed 15 of the drum mill of FIG. 3 is shown in FIG. 4. Here, a spacing s exists between the outflow channel 16 and the adjacent tearing knife 4. The advantages of the version of FIG. 3 are still attained, as long as the spacing s is no greater than the height H of the tearing knife 4 above the surface of the tearing bed 15.

FIG. 5 shows a variant of the outflow channel 16 of FIG. 4, in which a support wall 17 between the tearing knife 4 and the outflow channel 16 is lowered by a length h relative to the surface of the tearing bed 15. An adequate outflow of mash particles 8 is attained, as long as the lowering length h and the width w of the outflow channel 16 are greater than the height H of the tearing knife 4 above the surface of the tearing bed 15. FIG. 6 shows a variant of the outflow channel 16 of FIG. 3, in which not only is a support wall 18 between the tearing knife 4 and the outflow channel 16 lowered by a length h relative to the surface of the tearing bed 15, but the outflow channel 16 also widens in the passage direction of the comminuted substances and extends obliquely away from the adjacent tearing element 4. Once again, a good combination of the outflow of comminuted mash particles 8 and a stable mounting of the tearing knife 4 is achieved.

FIG. 7 shows a variant of the tearing bed 15 of FIG. 3, in which two outflow channels 16 and 16' immediately adjoin a tearing knife 4 on both sides. Although compared with the version of FIG. 3 twice as many outflow channels are required, nevertheless the advantage of gentle mash handling is preserved, even if, in the event of wear of one side of the tearing knives 4, the direction of rotation of the three vanes 5 for guiding the fruit 3 over the inside surface of the drum 14 is reversed in order to achieve a sharp cut once again.

As already noted above, the design according to FIGS. 1a and 1b, because of a selectable height H of the knifelike tearing elements 4 above the travel path of the tearing bed 15, makes a direct variation of the mash structure possible. The height H can be selected by disposing grooves of suitable depth on the surface of the tearing bed 15, into which grooves the knifelike tearing elements 4 are inserted. FIG. 8 shows a longitudinal section through one such groove 20, which has a lateral indentation for mounting a protrusion 21 of a tearing element 4. The tearing edge of the tearing element 4 is provided with a saw profile 22 in a manner known per se.

The tearing elements are embodied in a manner known per se as knives 4. FIG. 9 shows one advantageous arrangement of such a knife 4; its knife blade 23, along with the wall of the outflow channel 16, is inclined counter to the direction v of the delivery motion of the substances to be comminuted, and has a cutting angle B of greater than 90°. By this provision as well, the outflow of comminuted substances through the outflow channels 16 is improved.

Variants of the described design and use of the apparatus for comminuting organic substances are readily available to one skilled in the art. It can also be employed in tearing mills known per se that have a drumlike or a platelike embodiment of the tearing bed. If the tearing bed has a platelike embodiment, the openings for the comminuted substances are advantageously embodied as radially extending grooves with open outlets at the circumference of the plate. If the relative motion between the tearing elements and the delivery means is generated by a rotation of the plate, then the comminuted substances can simply flow out radially along the grooves by centrifugal force and be spun away from the outlets at the plate circumference. In that case, an axial course of the openings in the tearing bed is unnecessary.

What is claimed is:

1. An apparatus for comminuting organic substances, in particular for tearing apart fruits, including a stand (11), a tearing bed (15) supported in the stand (11) and having one surface as a travel path for the fruits (3), which path has tearing elements (4) and next to them openings (16) for the comminuted substances (8), the tearing elements (4) protruding above the travel path by a height (H), and including means (5, 13, 33), supported in the stand (11), for delivering the organic substances (3) to the tearing bed (15), and drive means (12) for generating a relative motion between the tearing elements (4) and the delivery means (5) and the organic substances (3), characterized in that the openings (16) in the tearing bed (15) for the comminuted substances (8) are disposed upstream of the tearing elements (4), in terms of the direction of relative motion (v), at a spacing (s) which is less than the height (H) of the tearing elements (4) above the travel path.

2. The apparatus of claim 1, characterized in that the openings (16) in the tearing bed (15) directly adjoin the tearing elements (4).

3. The apparatus of claim 2, characterized in that a support wall (17) between each opening (16, 16') in the tearing bed (15) and the adjacent tearing element (4) ends below the surface of the travel path.

4. The apparatus of claim 3, characterized in that the openings (16) extend obliquely away from the respective adjacent tearing element (4) in the direction of passage of the comminuted substances (8).

5. The apparatus of claim 2, characterized in that the openings (16) are widened in the direction of passage of the comminuted substances (8).

6. The apparatus of claim 5, characterized in that the openings (16) extend obliquely away from the respective adjacent tearing element (4) in the direction of passage of the comminuted substances (8).

7. The apparatus of claim 1, characterized in that the tearing elements are embodied as knives (4), and the knife blades (23) are inclined counter to the direction (v) of the delivery motion of the organic substances, and the knife blades (23) have a cutting angle (B) of greater than 90°.

8. The apparatus of claim 1, characterized in that grooves (20), in which knifelike tearing elements (4) can be inserted at a selectable height (H) above the travel path of the tearing bed (15), are disposed on the surface of the tearing bed.

9. The apparatus of claim 1, characterized in that the tearing bed (15) takes the form of a drum (14), on whose inner surface the travel path with the tearing elements (4) is located.

10. The apparatus of claim 1, characterized in that the tearing bed takes the form of a plate with a face end, and the travel path with the tearing elements is located on the face end.

11. The apparatus of claim 1, characterized in that one opening (16, 16') each is disposed on both sides of each tearing element (4).

12. The apparatus of claim 1, characterized in that the openings (16) are widened in the direction of passage of the comminuted substances (8).

13. The apparatus of claim 12, characterized in that the openings (16) extend obliquely away from the respective adjacent tearing element (4) in the direction of passage of the comminuted substances (8).

* * * * *